B. SCHWERIN.
ELECTRO-OSMOTIC PURIFICATION OF GELATINOUS SUBSTANCES.
APPLICATION FILED FEB. 16, 1915.

1,235,064.  Patented July 31, 1917.

UNITED STATES PATENT OFFICE.

BOTHO SCHWERIN, OF FRANKFORT-ON-THE-MAIN, GERMANY, ASSIGNOR TO ELEKTRO-OSMOSE AKTIENGESELLSCHAFT (GRAF SCHWERIN GESELLSCHAFT), OF FRANK-FORT-ON-THE-MAIN, GERMANY, A CORPORATION.

ELECTRO-OSMOTIC PURIFICATION OF GELATINOUS SUBSTANCES.

1,235,064.     Specification of Letters Patent.     Patented July 31, 1917.

Application filed February 16, 1915. Serial No. 8,661.

*To all whom it may concern:*

Be it known that I, BOTHO SCHWERIN, a subject of the German Emperor, residing at Frankfort-on-the-Main, Germany, have invented certain new and useful Improvements in Electro-Osmotic Purification of Gelatinous Substances, of which the following is a specification.

This invention relates to an electro-osmotic process of purifying gelatinous substances such as glue, gelatin and similar organic products, and of separating the constituents of such substances into two or more groups. The invention is also directed to the production of the gelatinous substances from the raw material simultaneously with the purification or subdivision of these substances.

The process comprises subjecting to an electric current between two electrodes a mixture of a gelatinous substance with an electrolyte-dissociating liquid such as an aqueous glue solution, which is separated from each of said electrodes by one or more diaphragms of various degrees of permeability.

In the accompanying drawing are illustrated two electric cells suitable for demonstrating the process.

Figure 1:
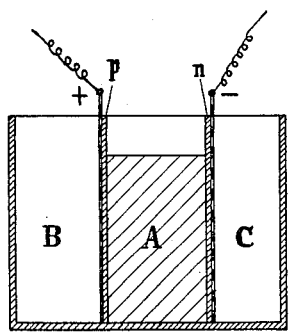
Figure 1 is a vertical sectional view through such a cell.

In both figures of the drawing $p$ and $n$ represent the anodic and cathodic diaphragm; A is the compartment containing the material under treatment; B the anodic compartment; and C the cathode compartment.

It is well known that osmotic diaphragms have various electric potentials and polarities, there being for instance diaphragms which are electrically indifferent, electrically positive, and electrically negative. The last two groups can be divided according to the degree of potential. When a solution of glue is confined in the middle compartment of a cell such as the one described, whose diaphragms are of electrically indifferent material, for instance parchment paper, that is, of such material which is permeable for inorganic ions, but not permeable for highly molecular or colloidal bodies, and subjected to the action of an electric current, the inorganic ions migrate into the cathodic or into the anodic compartment, while osmosis of the liquid and of the colloidal particles is prevented by the indifferent diaphragms. The glue is by this treatment freed from its ash-yielding constituents. At the same time albumin-like bodies present in the sol form in the glue are converted into the gel-form. At sufficient dilution the albumin body is precipitated and forms a solid layer on the bottom of the vessel. It can be separated mechanically by centrifugal action or filtration. In this manner a transparent glue is obtained.

If in the described arrangement (Fig. 1) an electrically indifferent material is used as a cathode diaphragm, and an electrically positive material such as animal bladder for the anodic diaphragm, the following takes place upon the passage of the current:

The inorganic ions migrate as before into the cathodic or anodic compartment, but in addition the organic constituents of negative character, for instance colloidal acids, migrate through the positive diaphragm into the anodic compartment; the albumin constituents migrate toward the anode and a part is deposited on the anodic diaphragm.

With the aid of this arrangement, namely with an indifferent cathodic diaphragm and a positive anodic diaphragm, glues of a superior quality can be made. The viscosity and melting temperature are hereby materially increased, and the amount of acid contained in the glue is reduced because the organic acid constituents have migrated into the anodic chamber.

Figure 2:
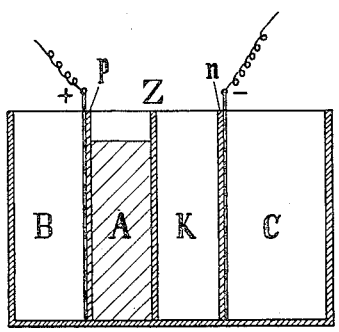
Fig. 2 is a similar view, illustrating a slightly modified arrangement.

To effect a more complete purification of the glue and even a separation of the same into its constituents the process is carried out in the cell shown in Fig. 2. If as shown in Fig. 2 the space between the two end-diaphragms $p$ and $n$ is divided by an intermediate diaphragm Z, which is of such a high negative potential (for instance of clay or silica) that the positively charged glutin particles of the glue can migrate into the cathodic middle-compartment K, and one introduces into the anodic middle compartment A a solution of glue, and water with or without the addition of suitable chemicals into the cathodic middle compartment K, then the following takes place when current is passed from one electrode to the other:

The inorganic ions migrate as before into the cathodic compartment C or anodic compartment B, as the intermediate diaphragms do not influence the migration, and certain organic constituents of negative character also migrate through the anodic diaphragms $p$ (when these diaphragms consist of a substance of positive character) into the anodic compartment. Furthermore according to this arrangement the glutin-like constituents migrate through the highly negative intermediate diaphragm into the cathodic middle compartment. Those constituents which, as above described, do not migrate, such as albumin-like bodies, coloring matters, fats, and sundry impurities remain in the middle compartment A. The solution in the cathodic middle compartment K becomes enriched with pure glue substance (glutin), which can be withdrawn and treated further.

If still more glutin or glutin-like constituents are to be withdrawn from the glue remaining in the anodic middle chamber, the cathodic middle chamber is filled with fresh water and the process conducted further.

If the glue-solution is separated from the electrodes by several intermediate diaphragms of a pre-determined potential forming a number of separate compartments, when the glue-substance is fractionated from chamber to chamber. The compartments nearest to the cathode become enriched by those glutin constituents which migrate the most rapidly, whereas the slower migrating glutin-constituents are enriched in the compartments near the anode.

The glues which have migrated under the influence of the electric current from the anodic into the cathodic middle chamber show surprising properties. They are qualitatively of high value. They have high viscosity and high strength of jelly, and are practically neutral, free from fat and ash-yielding constituents. They are also odorless and tasteless like gelatin. Such properties make these glues very valuable for numerous industries. The glue remaining behind in the anodic middle chamber is distinguished by high viscosity. The albumin body contained therein can remain with the solution, having been again brought into the sol-form, or separated and used for its own sake. This albumin body, when dried, is an extremely tough and elastic mass which swells in water but is insoluble both in cold and in warm water. It constitutes a complicated mixture mostly of bodies like globulin.

According to the invention the process may further extend to bodies which yield glue or gelatin. For instance ossein, the parent material for gelatin, may thus be freed from the masses of acids and salts still adhering to it after the maceration. Again, de-limed ossein may be freed in this way from the last traces of the lime which is injurious during the boiling operation. This latter modification of the process is most advantageously conducted at a raised temperature, in order to change the glue yielding material into glue or gelatin. In applying the process of purifying glue and gelatin as described directly to the glue yielding raw material itself, the necessary heat is produced usually through the electric current, but can be also supplied from other sources. The formation of the gelatinous substances can furthermore be assisted by the addition of suitable chemicals, for instance, traces of alkalies, lime, etc.

It is known that the manufacture of gelatin suitable for photographic emulsions is especially difficult and that it is not possible to determine beforehand with certainty whether a material prepared from gelatin will be a gelatin suitable for emulsions.

The present invention is particularly applicable to the manufacture of gelatin suitable for photographic emulsions. As above mentioned, it is possible to free the gelatin completely from ash-yielding constituents, so that no salts deleterious in the use of the gelatin in emulsions are contained therein. All reducing constituents are separated, and all turbidity due to suspension of albumin can be practically eliminated. Moreover, the freedom from fat plays a not unimportant part of the purposes in question.

I claim:—

1. A process of purifying and separating the constituents of an organic gelatinous substance by electro-osmosis which comprises placing said substance mixed with water between semi-permeable diaphragms impermeable for glutin and passing an electric current through the diaphragms and the mixture.

2. A process of purifying and separating the constituents of an organic gelatinous substance by electro-osmosis which comprises placing a mixture comprising said substance and water between semipermeable diaphragms impermeable for glutin and having different potential values, one of said diaphragms being electropositive, and passing an electric current through the diaphragms and the mixture.

3. A process of purifying and separating the constituents of an organic gelatinous substance which comprises placing a mixture comprising said substance and water between an indifferent semipermeable diaphragm and an electropositive diaphragm, each of said diaphragms being impermeable for glutin, and passing an electric current through the diaphragms and the mixture.

4. A process of purifying and separating the constituents of an organic gelatinous substance which comprises placing a mixture comprising said substance and water between an indifferent semipermeable diaphragm and an electropositive diaphragm, each of said diaphragms being impermeable for glutin, placing an aqueous liquid practically devoid of gelatinous constituents between said indifferent diaphragm and said mixture and maintaining the latter separated from said liquid by a diaphragm of predetermined polarity and more or less permeable for colloids, and passing an electric current through said diaphragms and the materials therebetween.

5. A process of purifying and separating the constituents of an organic gelatinous substance which comprises arranging a plurality of semi-permeable diaphragms between two electrodes to form anode and cathode chambers and at least one intermediate chamber, the diaphragms next to the electrodes being impermeable for glutin, and the diaphragm next to the anode being electropositive, placing a mixture comprising said gelatinous substance and water in an intermediate chamber, placing electric current-conducting aqueous liquids in the other chambers, and passing an electric current from one electrode to the other through the diaphragms and the material therebetween.

6. A process of purifying and separating the constituents of an organic gelatinous substance which comprises arranging a series of semipermeable diaphragms between two electrodes to form anode and cathode chambers and at least two intermediate chambers, the diaphragms next to the electrodes being impermeable for glutin and at least one of the intermediate diaphragms being permeable for glutin, placing a mixture comprising said gelatinous substance and water in an intermediate chamber between said glutin-permeable diaphragm and the anode, placing electric current-conducting aqueous liquids in the other chambers, and passing an electric current from one electrode to the other through the diaphragms and the material therebetween.

7. A process of purifying and separating the constituents of an organic gelatinous substance which comprises separating a mixture comprising said substance and water from an aqueous liquid initially practically devoid of gelatinous constituents by a colloid-permeable diaphragm, maintaining said mixture separated from an anode liquid by an electropositive diaphragm impermeable for glutin, maintaining said aqueous liquid separated from a cathode liquid by an indifferent diaphragm impermeable for glutin, and passing an electric current through said diaphragm and the liquids therebetween.

8. A process of making a purified gelatin suitable for photographic emulsions which comprises placing impure gelatin suspended in an electrolyte-dissociating liquid between semi-permeable diaphragms impermeable for glutin and passing an electric current through the diaphragms and the mixture.

9. A process of making a purified gelatin suitable for photographic emulsions which comprises placing a mixture comprising gelatin and water between semi-permeable diaphragms impermeable for glutin, one of said diaphragms having a greater positive potential than another, and passing an electric current through the diaphragms and the mixture.

10. A process of making a purified gelatin suitable for photographic emulsions which comprises placing a mixture comprising gelatin and water between an indifferent semipermeable diaphragm and an electropositive diaphragm, each of said diaphragms being impermeable for glutin, and passing an electric current through the diaphragms and the mixture.

11. A process of making a purified gelatin suitable for photographic emulsions which comprises placing a mixture comprising gelatin and water between an indifferent semi-permeable diaphragm and an electropositive diaphragm, each of said diaphragms being impermeable for the molecularly larger gelatin colloids, placing an aqueous liquid practically devoid of gelatinous constituents between said indifferent diaphragm and said mixture and maintaining the latter separated from said liquid by a diaphragm of predetermined polarity and more or less permeable for colloids, and passing an electric current through said diaphragms and the materials therebetween.

12. A process of making a purified gelatin suitable for photographic emulsions which comprises separating a mixture comprising gelatin and water from an aqueous liquid initially practically devoid of gelatinous constituents by a colloid-permeable diaphragm, maintaining said mixture separated from an anode liquid by an electropositive diaphragm impermeable for molecularly larger gelatin colloids, maintaining said aqueous liquid separated from a cathode liquid by an indifferent diaphragm impermeable for molecularly larger gelatin colloids, and passing an electric current through said diaphragms and the liquids therebetween.

13. A process of purifying gelatin-yielding material which comprises subjecting said material in contact with water and between diaphragms all of which are permeable for impurities and one of which is permeable for glutin, to the action of an electric current passing through said diaphragms.

14. A process of purifying gelatin-yielding material which comprises subjecting said material in contact with water and between diaphragms permeable for impurities, but impermeable for glutin, one of said diaphragms being more electro-positive than another, to the action of an electric current passing through said diaphragms.

15. A process of producing purified gelatinous substances which comprises subjecting gelatin-yielding material in contact with water and between diaphragms permeable for impurities but impermeable for glutin, to the action of an electric current passing through said diaphragms while maintaining said material at a temperature at which it will readily yield gelatin.

In testimony whereof I affix my signature in presence of two witnesses.

BOTHO SCHWERIN.

Witnesses:
JEAN GRUND,
CARL GRUND.